United States Patent
Bos et al.

(12)

(10) Patent No.: US 6,203,714 B1
(45) Date of Patent: Mar. 20, 2001

(54) DEVICE FOR FILTERING A LIQUID AND METHOD FOR DISINFECTING SUCH A DEVICE

(75) Inventors: Meindert Bos, Da Wierden; Dirk Marinus Koenhen, Dedemsvaart, both of (NL)

(73) Assignee: SepeQ B.V. (NL)

( * ) Notice: Subject to any disclaimer, the term of this patent is extended or adjusted under 35 U.S.C. 154(b) by 0 days.

(21) Appl. No.: 09/336,875

(22) Filed: Jun. 18, 1999

(30) Foreign Application Priority Data

Jun. 19, 1998 (NL) .................................................. 1009457

(51) Int. Cl.[7] .................................................. B01D 41/00
(52) U.S. Cl. ............................ 210/798; 210/90; 210/106; 210/149; 210/321.69; 210/333.01; 210/341; 210/636
(58) Field of Search .............................. 210/85, 90, 103, 210/106, 108, 149, 198.1, 203, 321.69, 332, 333.01, 333.1, 340, 341, 409, 411, 424, 425, 427, 175, 184, 143, 426, 636, 696, 742, 798, 136

(56) References Cited

U.S. PATENT DOCUMENTS

| | | | |
|---|---|---|---|
| 837,658 | * 12/1906 | Bayley | 210/340 |
| 844,438 | * 2/1907 | Bayley | 210/424 |
| 2,854,140 | 9/1958 | Muller . | |
| 3,405,037 | * 10/1968 | Aronson et al. | 210/341 |
| 4,162,973 | * 7/1979 | Lynch | 210/341 |
| 4,846,976 | * 7/1989 | Ford | 210/321.69 |
| 4,923,068 | * 5/1990 | Crowson | 210/340 |
| 6,054,059 | * 4/2000 | Lattimer et al. | 210/321.69 |

FOREIGN PATENT DOCUMENTS

| | | |
|---|---|---|
| 3327184 | 2/1985 | (DE) . |
| 792800 | 4/1958 | (GB) . |
| 62083004 | 4/1987 | (JP) . |
| 04250831 | 9/1992 | (JP) . |
| 06233920 | 8/1994 | (JP) . |
| 08084989 | 8/1996 | (JP) . |
| 96/32183 | 10/1996 | (WO) . |

OTHER PUBLICATIONS

Search Report, Dutch Appln. 1,009,457,Jun. 19, 1998.

* cited by examiner

Primary Examiner—Joseph W. Drodge
(74) Attorney, Agent, or Firm—Watts Hoffman Fisher & Heinke Co., L.P.A.

(57) ABSTRACT

Device for filtering a liquid. The filter device is provided with at least two filter elements (8, 15) placed parallel to each other. A three-way cock (6, 13) is accommodated in the pipe (4, 5) to each filter element (8, 15) for connection of the inflow opening of each filter element (8, 15) to a mains system (3) for supplying the liquid with sufficient pressure to press the liquid through the filter device. The three-way cocks (6, 13) are mutually connected by a pipe (19). A drain (23) to a sewer is provided which has a closing device (21), which is connected to a branch point (26) of the pipe (19) via a pipe (20). A three-way cock (10, 17) is accommodated in the pipe (9, 16) of each filter element (8, 15) for connecting the outflow opening of each filter element (8, 15) to a mains system (12) of a user. The three-way taps (10, 17) are mutually connected by a pipe (24).

13 Claims, 11 Drawing Sheets

DEVICE FOR FILTERING A LIQUID AND METHOD FOR DISINFECTING SUCH A DEVICE

BACKGROUND OF THE INVENTION

The invention relates to a device for filtering a liquid, for instance water and more particularly drinking-water for domestic use, which filter device is provided with a filter element.

Such devices have been used for quite some time now for filtering water, and make use of for instance micro filtration and ultra filtration. Particularly micro organisms such as oocysts, cysts (Cryptosporidium, Girardia), bacteria and possibly viruses are filtered from the water by the filter element, so that the filtered water can be used as drinking-water. The first two kinds of micro organisms can be removed by micro filtration, whereas ultra filtration can also (partly) remove the other kinds of micro organisms. The filter elements that are preferably used for this purpose are based on capillary membranes (although other filter elements can be used also), and can or are exclusively provided with an inflow opening or inflow side for the liquid to be filtered and an outflow opening for the filtered liquid, or additionally be provided with one of more connections for discharging concentrate. In the latter case a flow over the membrane surface also arises, which in the classical ultra filtration is called "cross-flow" filtration. After a while such a filter element becomes dirty and cleansing it by flushing the filter element in counter direction is necessary to ensure a good working of the filter element. In the common devices the filter element needs to be removed from the device to that end. The filter element also needs to be disinfected regularly, which up until now has been done by using chemical agents added to the water going through the filter element. In the known devices the filter element cannot be used for filtering the water or the liquid during flushing the filter element and its disinfecting.

SUMMARY OF THE INVENTION

It is among others an object of the present invention to provide a device for filtering a liquid in which the interruption of the normal filter activity of the device during the flushing and disinfecting of the filter element is kept to a minimum. It also an object of the invention to obtain a disinfection of a filter element with a minimal use of chemical agents.

To that end the present invention according to a first aspect provides a device for filtering a liquid, which filter device is provided with a filter element with only an inflow opening or inflow side for the liquid to be filtered and an outflow opening for the filtered liquid, and with a pipe for leading the liquid to the inflow opening or inflow side and a pipe for leading the liquid from the outflow opening or outflow side, the pipe for leading the liquid to the inflow opening or inflow side being connectable to a mains system for supplying the liquid with sufficient pressure to press the liquid through the filter device, characterized in that the device is provided with at least two filter elements placed parallel to each other, a three-way cock being accommodated in the pipe to each filter element for connection of the inflow opening or inflow side of each filter element to the mains system, the three-way cocks being mutually connected by a pipe, with a drain to a sewer or the like, which drain is provided with a closing device, the closing device being connected to a branch point of the pipe, a three-way cock being accommodated in the pipe of each filter element for connecting the outflow opening or outflow side of each filter element to a mains system of a user, the three-way cocks being mutually connected by a pipe. By using two filter elements in the device according to the invention, which are connected to each other in a specific manner by three-way cocks and pipes, the cleansing of the filter elements can be achieved simply by letting liquid, for instance water, flow through them in counterflow by correctly operating the three-way cocks. None of the filter elements have to be taken out of the device to that end. Moreover, for flushing one of the filter elements filtered liquid coming from the other filter element is used.

In a preferred embodiment of a device according to the invention, the pipe has a branch point between the three-way cocks at the outflow side of the filter elements, a pipe being arranged between this branch point and the branch point between the three-way cocks at the inflow side of the filter elements, a closing device, a pump and a heating element being arranged in the pipe between the branch points. In this way it is possible to disinfect the filter elements without removing them from the device, by liquid, for instance water, that at least has a temperature of 65° C., for instance 80° C., so that no chemical agents are necessary. Moreover, during disinfecting a filter element, the other filter element is capable of filtering the liquid, for instance water, in the usual manner.

According to a second aspect of the present invention a device is provided for filtering a liquid, which filter device is provided with a filter element with an inflow opening or inflow side for the liquid to be filtered, an outflow opening for the filtered liquid and a connection for discharging concentrate, and with a pipe for leading the liquid to the Inflow opening or inflow side, a pipe for leading the liquid from the outflow opening or outflow side, and with a pipe for leading away the concentrate from the connection, the pipe for leading the liquid to the inflow opening or inflow side being connectable to a mains system, for supplying the liquid with sufficient pressure to press the liquid through the filter device, characterized in that the device is provided with at least two filter elements placed parallel to each other, a three-way cock being accommodated in the pipe to each filter element for connection of the inflow opening or inflow side of each filter element to the mains system, the three-way cocks being mutually connected by a pipe, with a drain to a sewer or the like, a closing device being arranged in each pipe for leading away the concentrate from the connection, said pipes being connected to the drain via a pipe, a three-way cock being accommodated in the pipe of each filter element for connecting the outflow opening or outflow side of each filter element to a mains system of a user, the three-way cocks being mutually connected by a pipe. By using two filter elements in the device according to the invention, which are connected to each other in a specific manner by three-way cocks and pipes, the cleansing of the filter elements can be achieved simply by letting liquid flow through them in counterflow by correctly operating the three-way cocks. None of the filter elements have to be taken out of the device to that end. Moreover for flushing one of the filter elements filtered liquid coming from the other filter element is used. Moreover, in this way the flow over the membrane surface is not used during the filtration, as is the case in the classical ultra filtration, but to flush away dirt stopped by the filter element. As a result of this so-called "forward-flush" less has to be cleansed in counterflow and so less valuable filtered liquid is used in the cleansing in counterflow.

Preferably the device according to the invention comprises a control means, the control means being connected to a temperature meter and a pressure meter for receiving measuring data therefrom, and the control device being connected to operating means of the three-way cocks, the closing devices, the pump and the heating element for operation thereof. In this way the entire operation of the device including cleansing and disinfecting of the filter elements can take place automatically.

The invention also relates to a method for disinfecting a device for filtering a liquid according to the invention, characterized in that the filter device is provided with at least two filter elements, in that the filter elements are deactivated, the deactivated filter elements subsequently being flushed with filtered liquid in a closed circuit, the filtered liquid prior To being led through a filter element being brought at a disinfecting temperature of at least 65° C. In some cases agents for preventing lime scale can be added to the filtered liquid.

BRIEF DESCRIPTION OF THE DRAWINGS

Some embodiments of a device and a method according to the invention will by way of example be elucidated on the basis of the figures, in which.

DETAILED DESCRIPTION OF THE INVENTION

Figure 1:
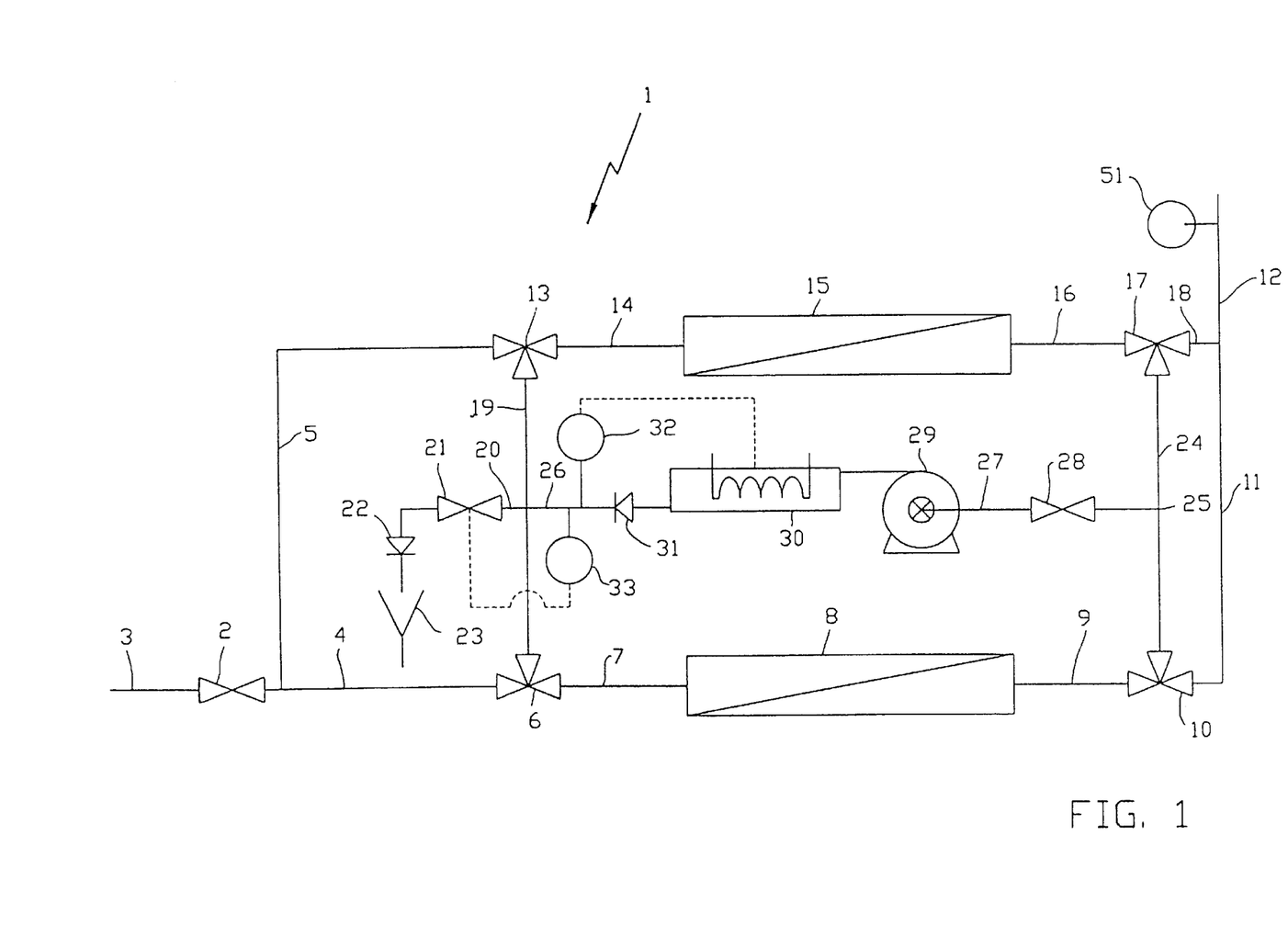
FIG. 1 schematically shows the device according to the first aspect of the invention.

FIG. 1 schematically shows an arrangement of the device according to the first aspect of the present invention. The device 1 is connected to a mains system 3, for supplying the liquid with sufficient pressure to press the liquid through the filter device, via a main cock 2. In the continuation of the description water will be chosen as liquid, although it will be clear that any other liquid can be used. After cock 2 the pipe branches off in two separate pipes 4 and 5. The pipe 4 is connected to the inflow side or inflow opening of a first filter element 8 via a three-way cock 6 and a pipe 7. The outflow side or outflow opening of the first filter element 8 is connected to the user's mains system 12 via a pipe 9, a three-way cock 10 and a pipe 11.

The pipe 5 is connected to the inflow side of a second filter element 15, via a three-way cock 13 and a pipe 14. The outflow side of the second filter element 15 is also connected to the user's mains system 12 via a pipe 16, a three-way cock 17 and a pipe 18.

The three-way cock 6 and the three-way cook 13 are mutually connected by a pipe 19. In the pipe 19 a branch 20 is present through which the water can be discharged to a drain 23 via a closing device 21 and a non-return valve 22.

The three-way cock 10 and the three-way cock 17 are mutually connected by a pipe 24.

Figure 2:
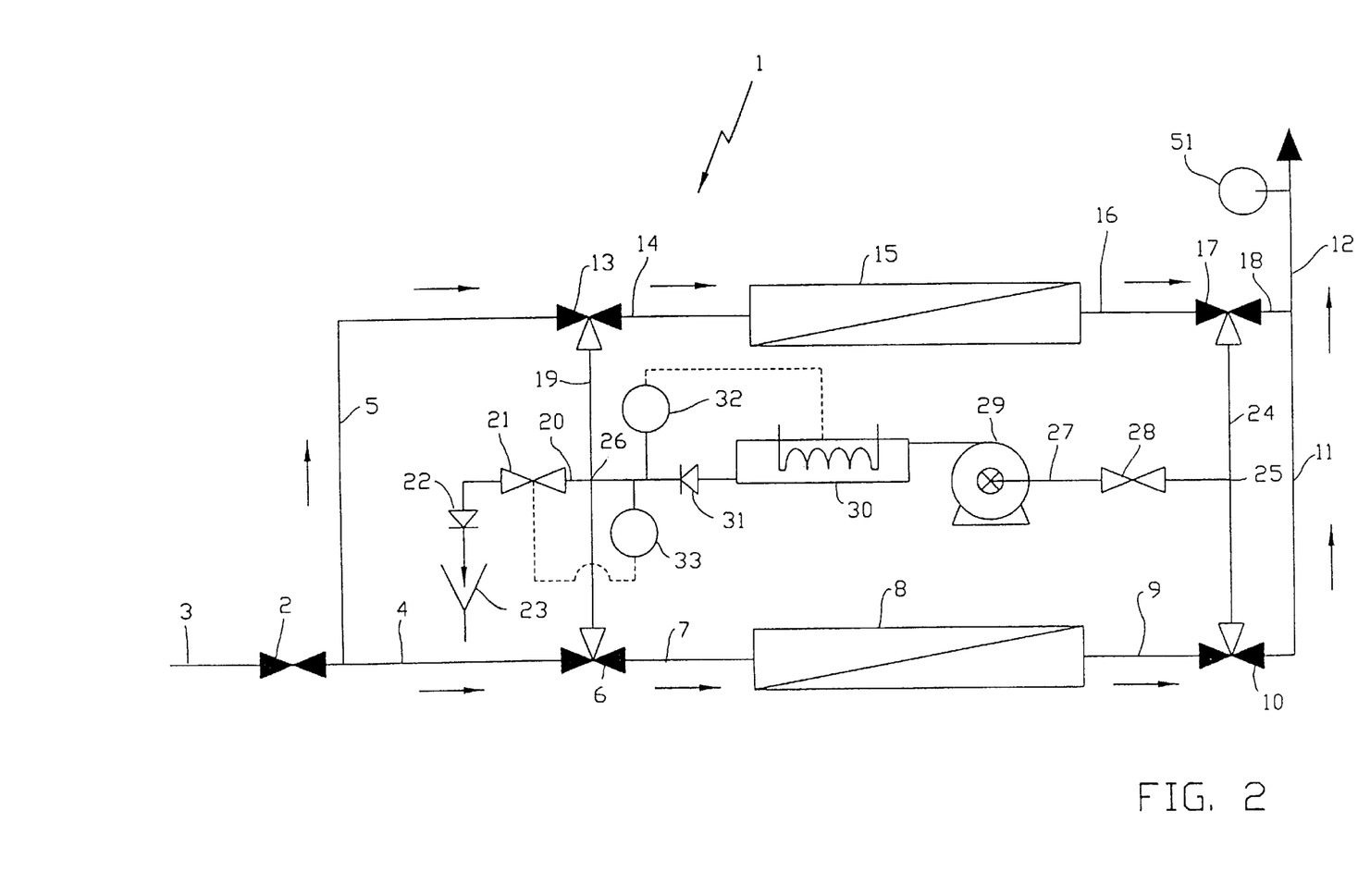
FIG. 2 schematically shows the water flow directions in a device according to FIG. 1 for filtering water.

At the user's side the water is obtained as follows, which water comes from the water mains system 12 and which has to be purified (in FIG. 2 the direction of the water flows are indicated by arrows for this case). The main cock 2 to the water mains system 3 is opened. The three-way cock 6 is placed in the position in which the water can flow from the pipe 4 to the pipe 7. The three-way cock 10 is placed in the position in which the water can flow from the pipe 9 to the pipe 11. The three-way cook 13 is placed in the position in which the water can flow from the pipe 5 to the pipe 14. Furthermore the three-way cock 17 is placed in the position in which the water can flow from the pipe 16 to the pipe 18.

With the cocks in the above-mentioned positions, the water will flow via both filter elements 8 and 15 when the user taps water from the water mains system 12, and thus purified water will be obtained.

In order to prevent that one or both elements 8, 15 get polluted, or in order to cleanse the filter elements from such a pollution, the filter elements have to be rinsed regularly, this is known under the name of "backwash".

Figure 3:
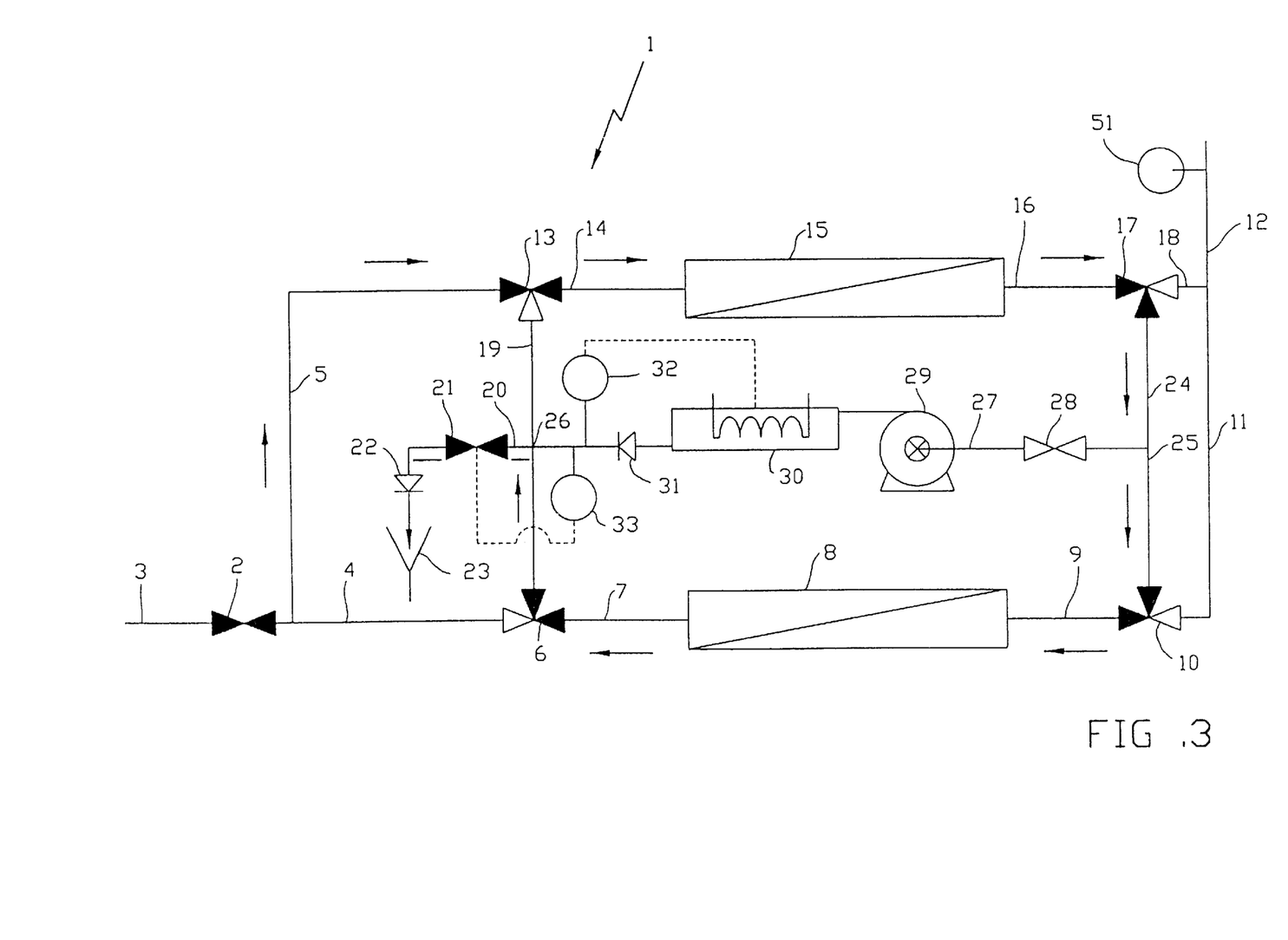
FIG. 3 schematically shows the water flow directions in a device according to FIG. 1 for cleansing the first filter element.

In case of "backwash" of the first filter element 8, the three-way cocks 10 and 17 are placed in the position in which the pipe 9 is connected to the pipe 16 via the pipe 24. Now by placing the three-way cock 6 in the position in which the pipes 7 and 19 are connected to each other, and opening the closing device 21, the water will flow through the second filter element 15 in the direction that the water is filtered and through the first filter element 8 in counter, the "backwash", direction (in FIG. 3 the directions of the water flows for this case are indicated by means of arrows).

Figure 4:
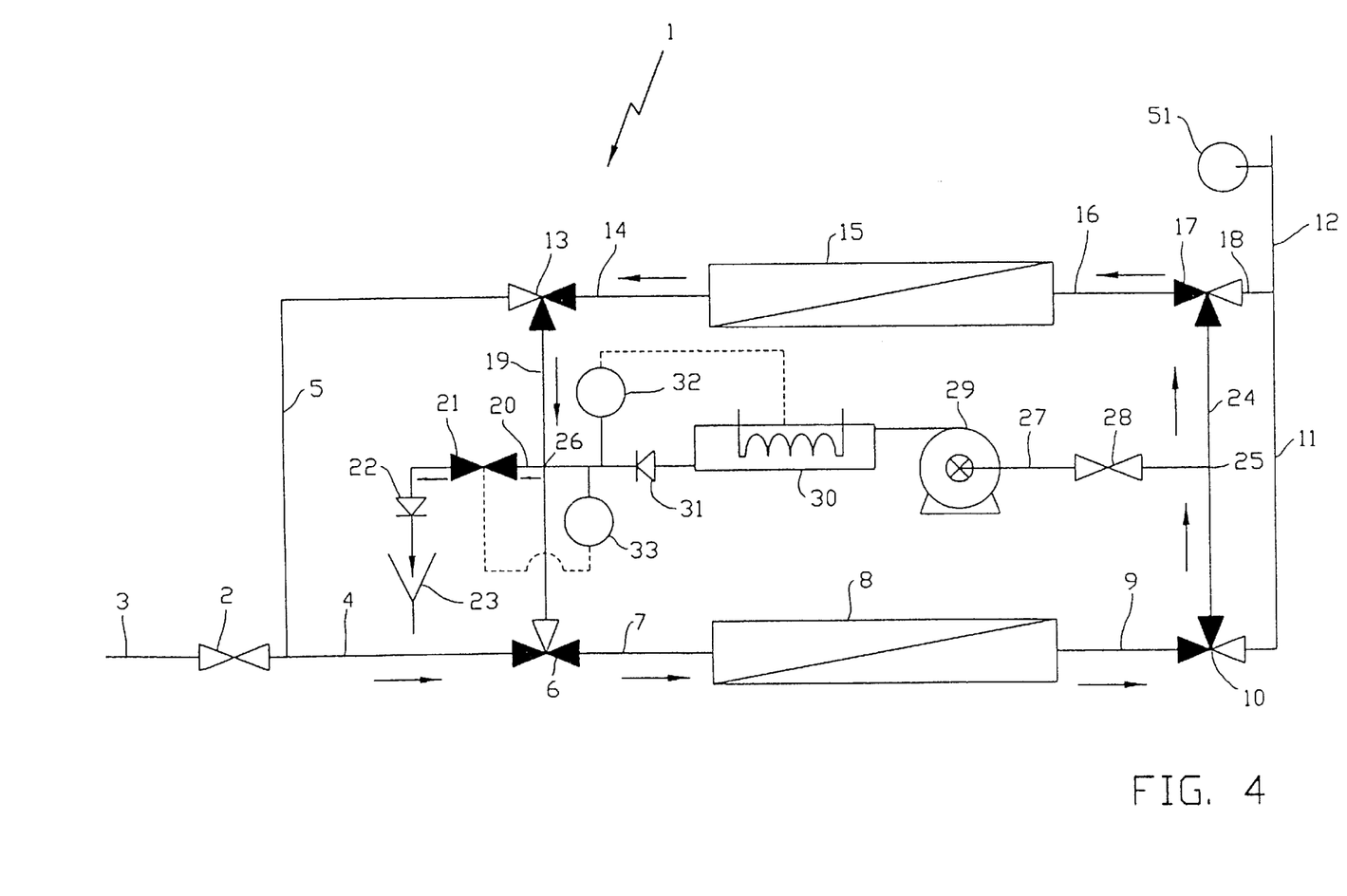
FIG. 4 schematically shows the water flow directions in a device according to FIG. 1 for cleansing the second filter element.

In case of a "backwash" of the second filter element 15, three-way cocks 10 and 17 are placed in the position in which the pipe 9 is connected to the pipe 16 via the pipe 24. Now by placing the three-way cock 13 in the position in which the pipes 14 and 19 are connected to each other, and opening the closing device 21, the water will then flow through the first filter element 8 in the direction that the water is filtered and through the second filter element 15 in counter, the "backwash", direction (in FIG. 4 the directions of the water flows for this case are indicated by means of arrows).

So during rinsing out a filter element filtered water is used that comes from the other filter element, and therefore the filter at the side from which filtered water is topped, will never be polluted by substances present in the water which have to be filtered out of the water.

The device according to the invention further offers the possibility after one of the filter elements or both filter elements have been rinsed out, to disinfect the rinsed-out filter element, by bringing the filter at a temperature of for instance 80 degrees Celsius during a certain period of time. To that end the device according to the invention contains a pipe 27 between a branch point 23 in the pipe 24 and a branch point 26 in the pipe 17. In said pipe 27 a closing device 28, a pump 29, a heating element 30 and a non-return valve 31 are accommodated in series.

In case of disinfecting the first filter element 8, the three-way cocks 13 and 17 are placed In the position in which the pipes 14 and 19 and the pipes 16 and 24 are not connected to each other. The three-way cocks 6 and 10 are placed in a position in which the pipe 9 is connected to the pipe 27 via the pipe 24, and the pipe 27 is connected to the pipe 7 via the pipe 19. Now by activating the pump 29 and the heating element 30 the purified water coming from the first filter element 8 will be pumped around as is indicated by the arrows in FIG 5. Here the water is brought at the desired disinfecting temperature by the heating element 30. At the end of disinfecting the closing device 21 can be opened, so that the water used during disinfecting can be discharged.

In case of disinfecting the second filter element 15, the three-way cocks 6 and 10 are placed in the position In which the pipes 7 and 19 and the pipes 9 and 24 are not connected to each other. The three-way cocks 13 and 17 are placed in the position in which the pipe 16 is connected to the pipe 27 via the pipe 24, and the pipe 27 is connected to the pipe 14 via the pipe 19. Now by activating the pump 29 and the heating element 30 purified water coming from the first filter element 8 will be pumped around as is indicated by the arrows in FIG. 6. Here the water is brought at the desired disinfecting temperature by the heating element 30. At the end of disinfecting, the closing device can be 21 opened, so that the water used during disinfecting can be discharged.

It is noted that during disinfecting one of the filter elements, water coming from the water mains system 3 can flow through the other filter element to the user's water mains system 12.

Because during disinfecting the pressure of the water in the pipe 27 to the branch point 26 increases and it being important for a correct disinfection that the temperature of the water be monitored, a temperature meter 32 and a pressure meter 33 for measuring the temperature and the pressure, respectively, of the water are accommodated in the pipe 27. On the basis of the data obtained from the temperature meter 32 and the pressure meter 33, for instance an operator can deduct whether the closing device 21 needs to be opened for lowering the pressure in pipe 27, and possibly adjusting the activity of the heating element 30 to keep the temperature of the water at the desired level. It is however preferred to provide a control means (for the sake of simplicity not shown in the drawing), which is connected to the temperature meter 32 and the pressure meter 33 for receiving their measuring data. The control means are also connected to the operation means of the three-way cocks 6, 10, 13, 17, the closing devices 21, 28 the pump 29 and the heating element 30 for their operation. In this way not only the disinfecting can take place software-controlled, but the other activities as well.

Figure 7:
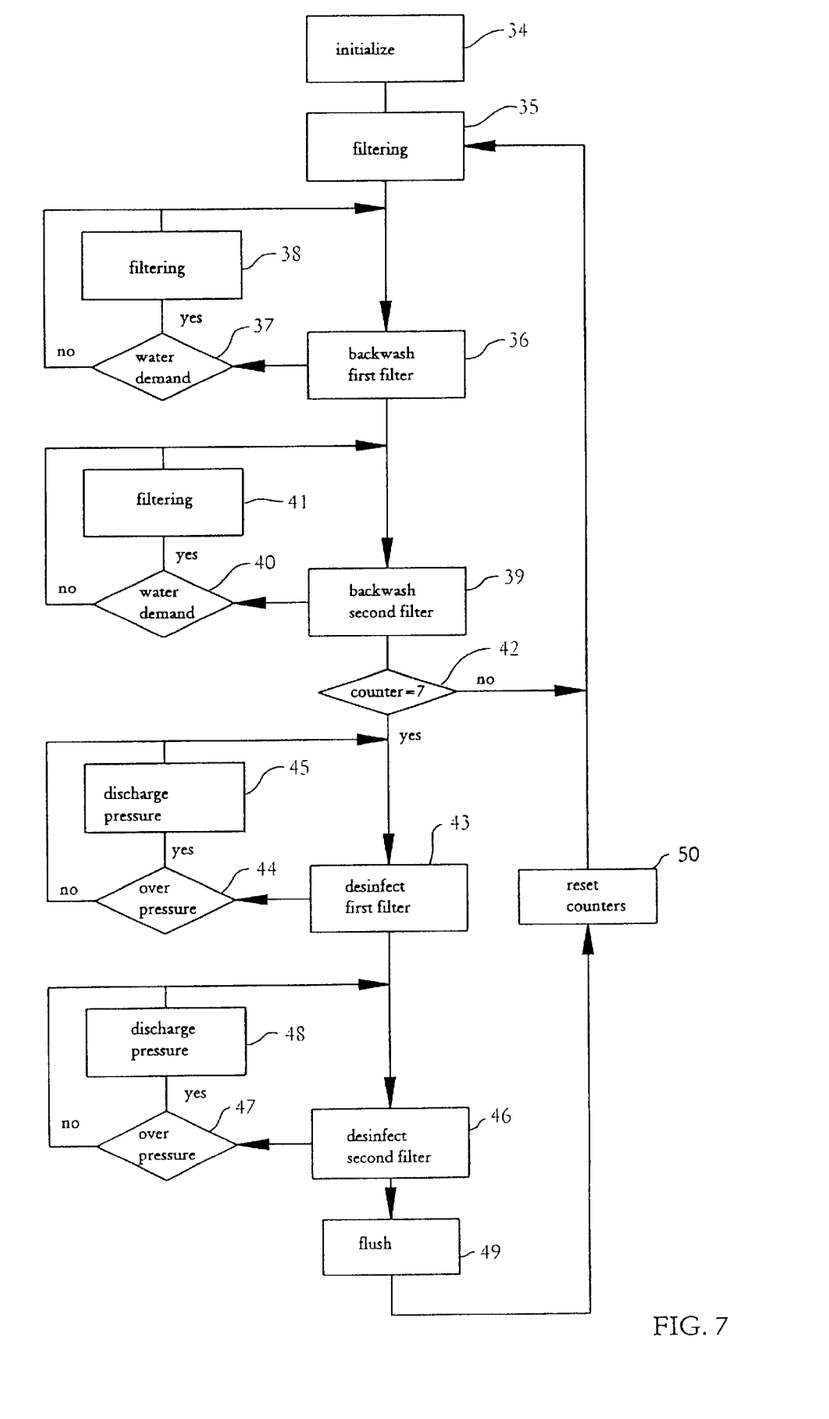
FIG. 7 shows a flow chart for the computer controlled activity of the device according to FIG. 1.

FIG. 7 schematically shows a flow chart for the computer controlled activity of the device according to the invention. In step 34 the entire device with all parts is initialized. In this step for instance the entire device is filled with water. Subsequently in step 35 the filtration takes place for a certain duration to be adjusted and inputted in the software (for instance the number of hours).

After the adjusted duration has lapsed, the "backwash" of for instance the first filter element takes place, in step 36 for a duration to be adjusted (for instance a number of seconds). To that end the control means automatically controls the three-way cocks concerned and the closing devices concerned to realize the wanted "backwash". In the user's water mains system 12 a pressure meter 51 is accommodated, which on the basis of the pressure measured can indicate whether a user wishes to take water from the device. Said pressure meter 51 is connected to the control means. When a user wishes to take water from the device during a "backwash" step, this is detected in step 37, and the control means device switch the device to filtering (step 38) the water. When there is no demand for water, the device continues the "backwash".

After the first filter elements have been subjected to a "backwash" step, the "backwash" of the second filter element takes place in step 19, here as well for a duration which is to be adjusted (for instance a number of seconds). When there is a demand for water, detected in stop 40, the control means switch the device to filtering the water in step 41. When there is no more demand for water, the device continues the "backwash" step.

Furthermore it can be inputted in the software that after a certain number of times (for instance 7 times) of rinsing the filter elements, the control means switch the device to the activity of disinfecting the filter elements. This is determined in step 42.

Disinfecting the first filter element takes place in step 43 for a duration to be adjusted (for instance a certain number of minutes) at a temperature to be adjusted (of for instance 80° C.). When the pressure meter 33 (see FIG. 1) detects in step 44 that the pressure becomes too high, the closing device 21 is opened so that water can be discharged in step 45. After disinfecting the first filter element the disinfecting of the second filter element takes place in step 46 for a duration to be adjusted (for instance a certain number of minutes) at a temperature to be adjusted (of for instance 80° C.). When the pressure meter 33 (see FIG. 1) detects in step 47 that the pressure becomes too high, the closing device 21 is opened so that water can be discharged in step 48.

After disinfecting the device, the device is preferably rinsed in step 49, after which the counters are reset at nil in step 50, and step 35 is returned to.

A supply of the liquid to be filtered, such as for instance water, and more particularly drinking-water for domestic use, when using a device according to the invention is only temporarily interrupted during the "backwash" of the filter elements, although this temporary interruption can be kept at a minimum by the control means.

FIGS. 8 to 11 schematically show an arrangement of the device 1 according to the second aspect of the present invention. In these figures for the same elements as in the preceding figures the same reference numbers are used. The differences with the device according to the first aspect of the invention are that each filter element 8, 15 now is additionally provided with a connection 55, 54 for discharging the concentrate from the filter element, and that the drain 23 is now no longer connected to branch point 26. Pipes 53, 52 are connected to the connections 55, 54, in which pipes closing devices 21 are arranged. The pipes 53, 52 are connected to a pipe 56 which discharges the concentrate to a drain 23.

Figure 8:
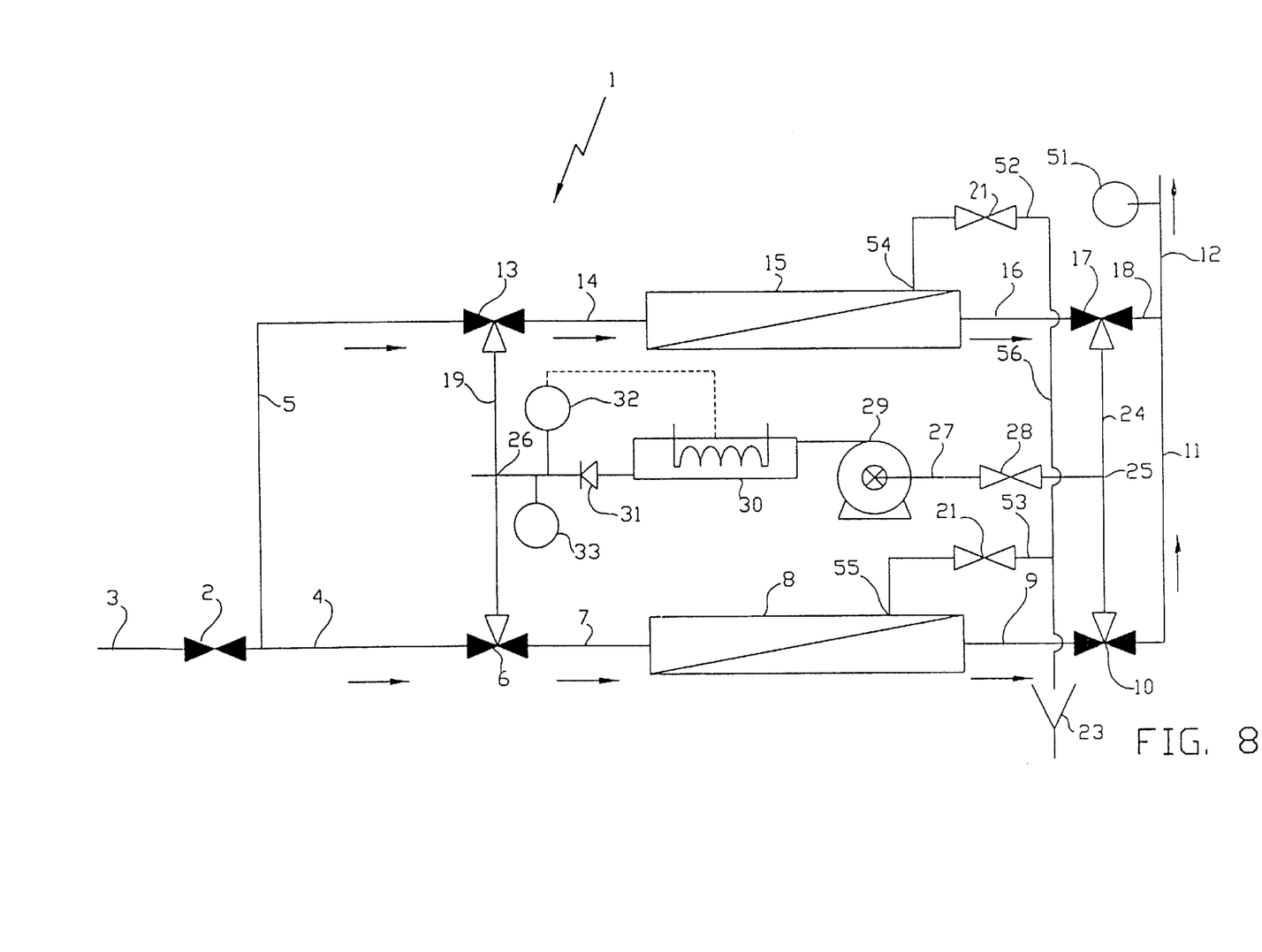
FIG. 8 schematically shows the water flow directions in a device according to the second aspect of the present Invention for filtering water.

In FIG. 8 the situation is shown in which three-way cocks 6, 10, 13, 17 and the closing devices 21, 26 are in such a position that the liquid supplied, for instance water, is filtered. The flow direction of the water is indicated by arrows.

Figure 9:
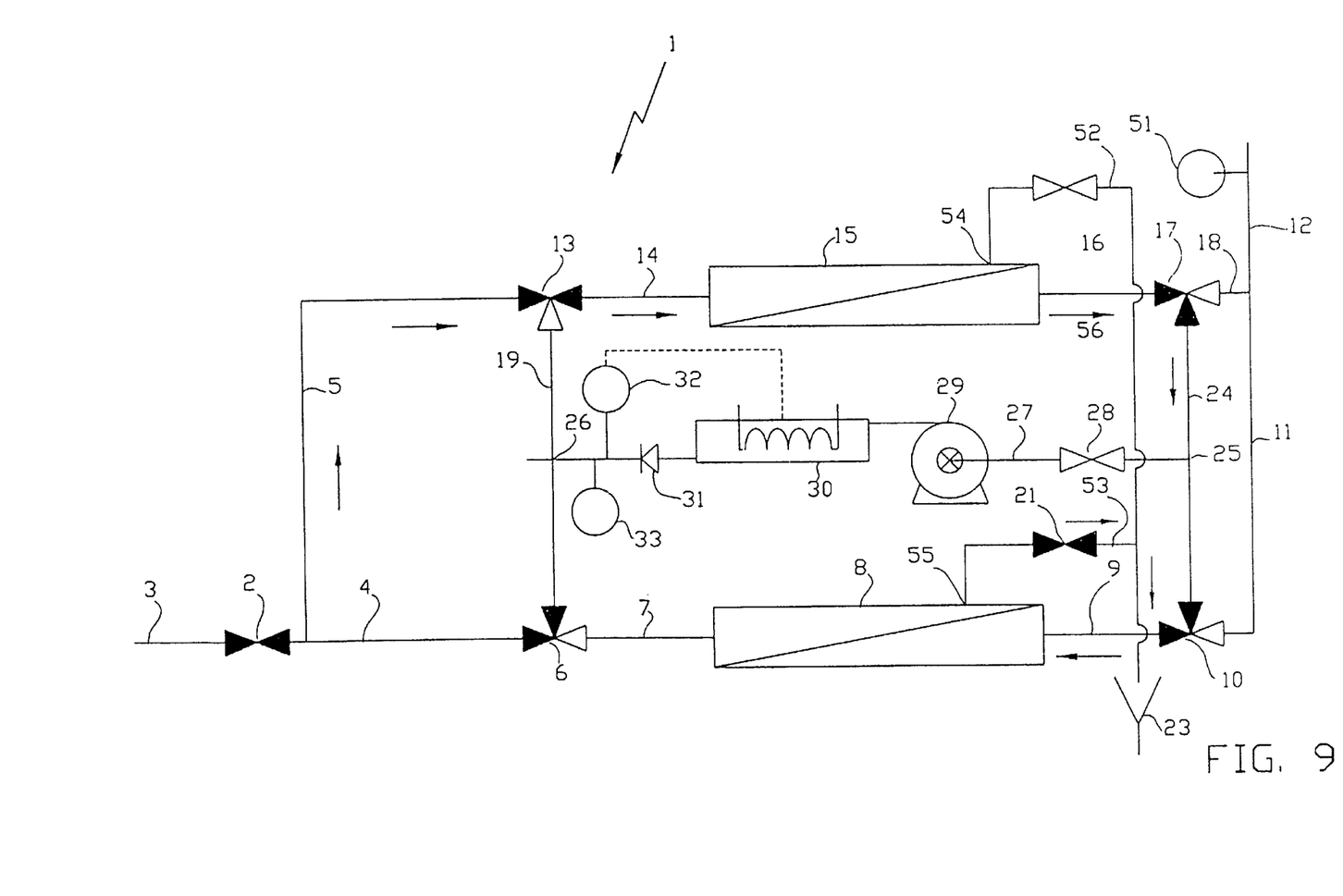
FIG. 9 schematically shows the water flow directions in a device according to FIG. 8 for cleansing the first filter element in a counterflow (backwash)

In FIG. 9 the situation is show, in which three-way cocks 6, 10, 13, 17 and the closing devices 21, 28 are in such a position that the first filter element 8 is cleansed in counterslow (backwash). The flow direction of the water is indicated by arrows. The pollution leaves the first filter element 8 via the connection 55 and the closing device is adjusted such that it is transported to the drain 23. It fill be clear that as a result of a suitable adjustment of the position of the three-way cocks, the second filter element can be cleansed in counterflow in an analog manner.

Figure 10:
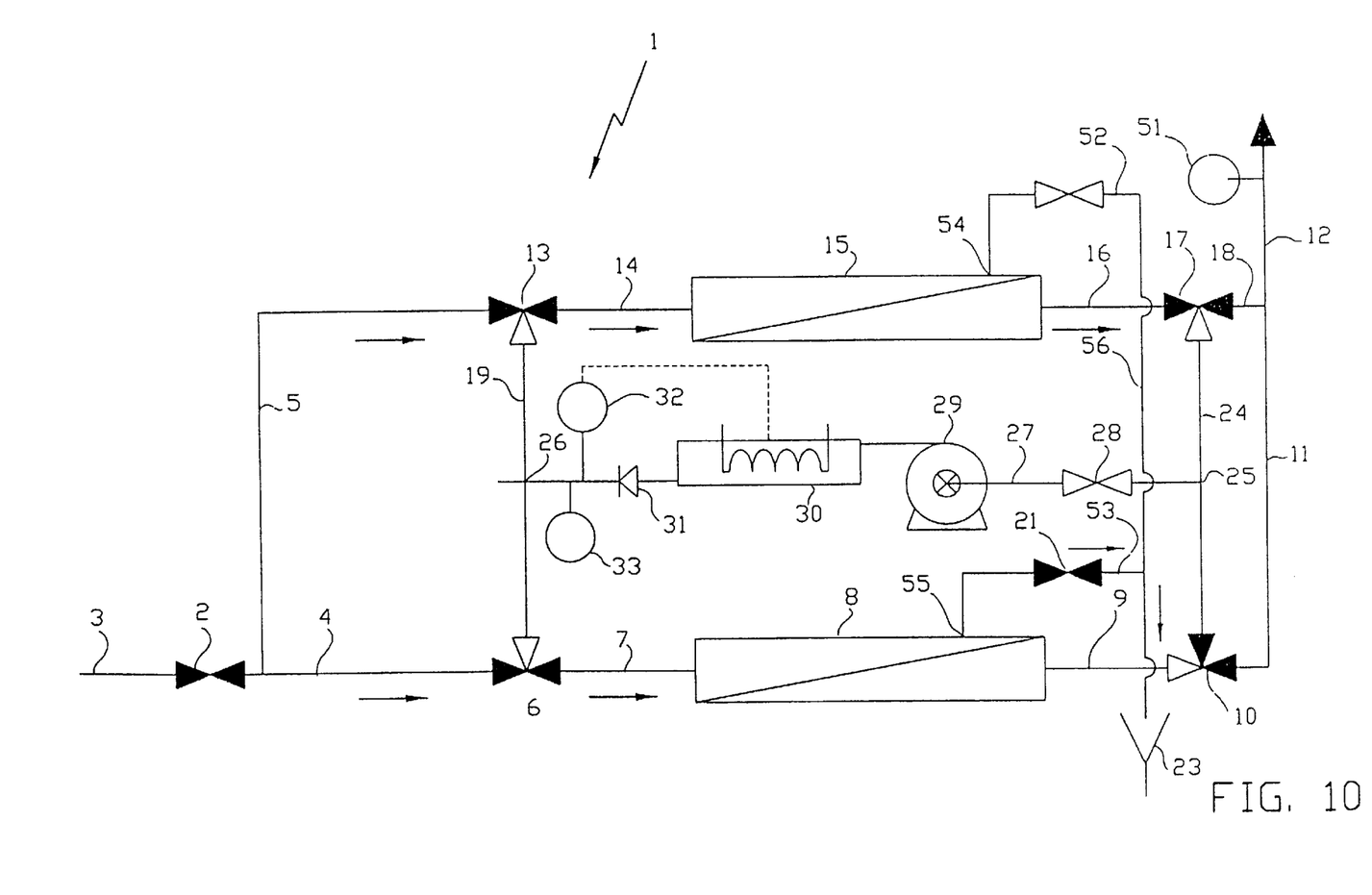
FIG. 10 schematically shows the water flow directions in a device according to FIG. 8 for cleansing the first filter element in a forward flow (forward-flush)

In FIG. 10 the situation is shows in which the three-way cocks 6, 10 13, 17 and the closing devices 21, 28 are in such a position that the first filter element 8 is cleansed in forward flow (forward-flush). The flow direction of the water is indicated by arrow. The pollution leaves the first filter element 8 via the connection 55 and the closing device is adjusted such that it is transported to the drain 23. It will be clear that as a result of a suitable adjustment of the position of the three-way cocks, the second filter element can be cleansed in forward flow in an analog manner. The advantage of said forward-flush is that less has to be cleansed in counterflow, as a result of which less valuable, filtered water needs to be used for the cleansing.

Figure 5:
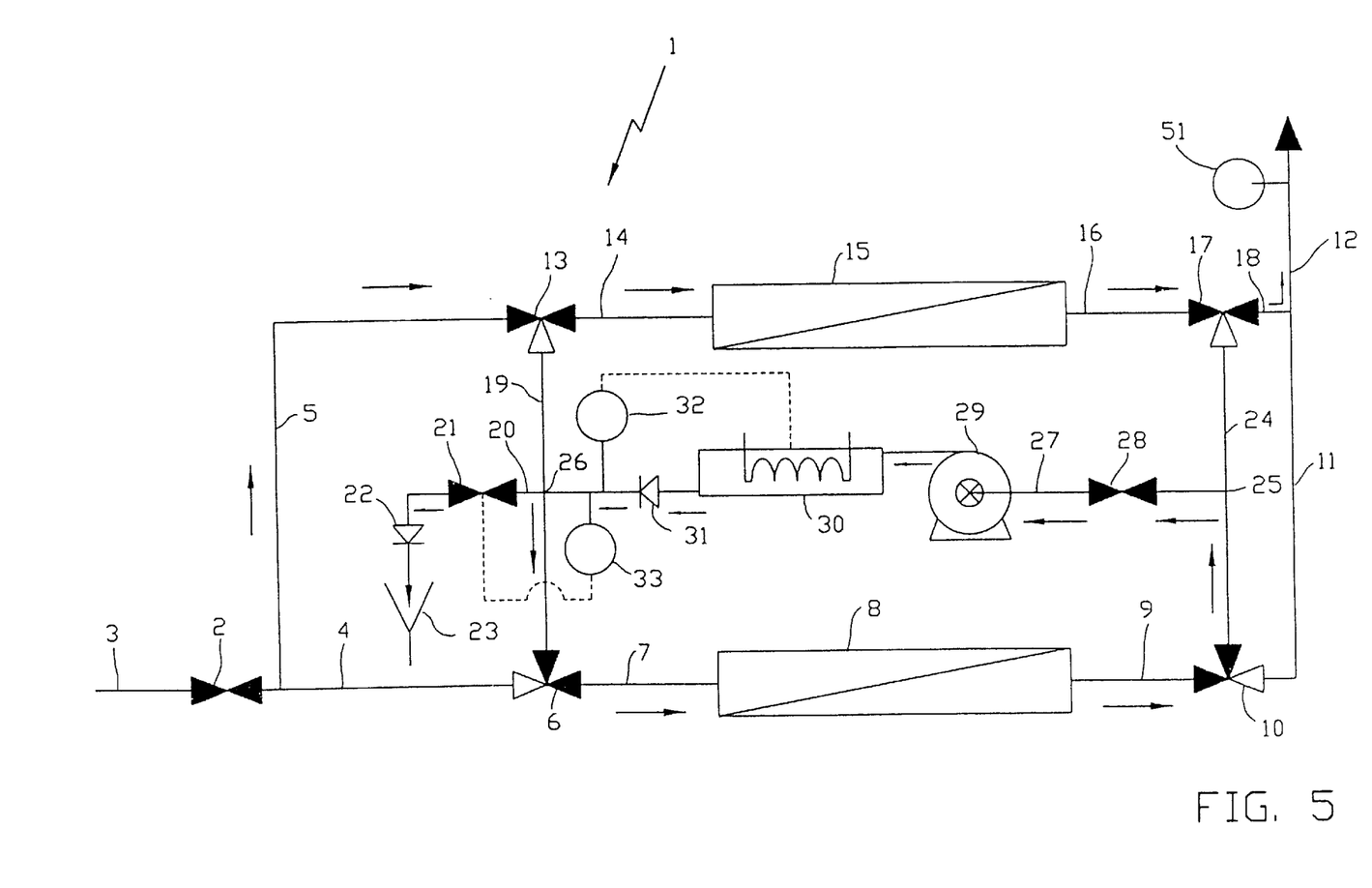
FIG. 5 schematically shows the water flow directions in a device according to FIG. 1 for disinfecting the first filter element.
Figure 6:
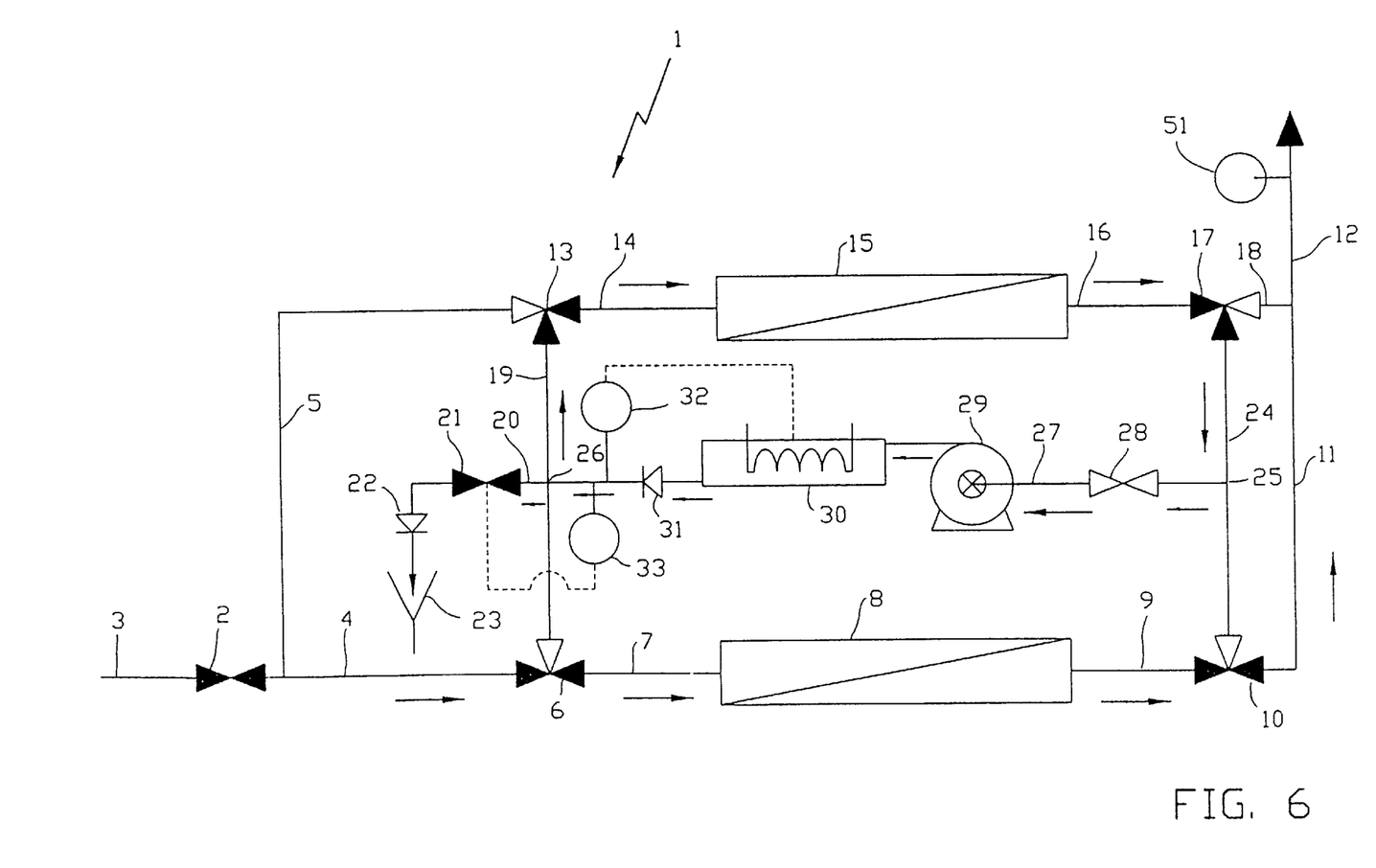
FIG. 6 schematically shows the water flow directions in a device according to FIG. 1 for disinfecting the second filter element.
Figure 11:
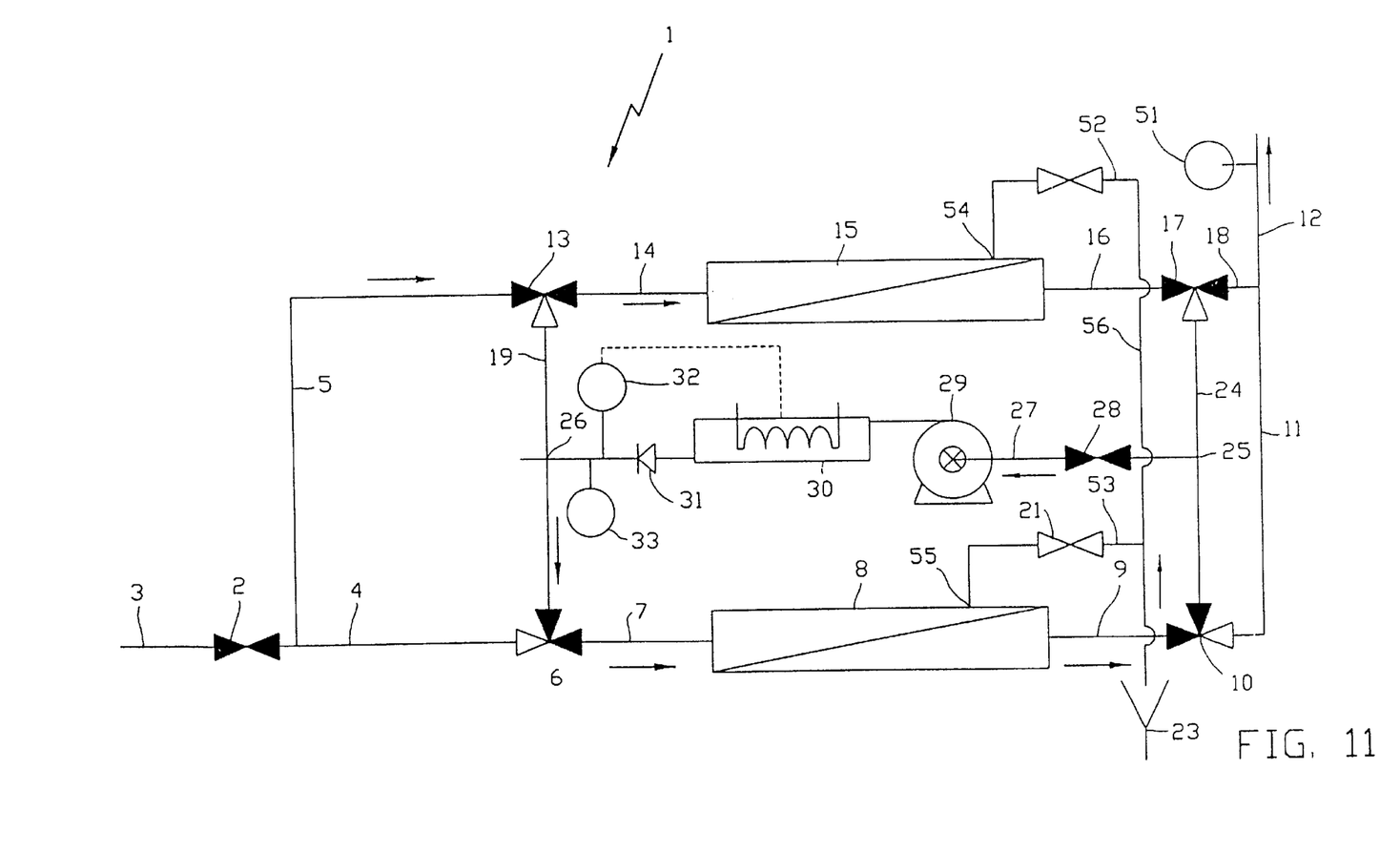
FIG. 11 schematically shows the water flow directions in a device according to FIG. 8 for disinfecting the first filter element.

In FIG. 11 the situation is shown in which three-way cocks 6, 10, 13, 17 and the closing devices 21, 28 are in such a position that the first filter element 8 is disinfected. The flow direction of the water is indicated by arrows. For a more detailed description of the disinfection, the description of FIGS. 5 and 6 is referred to. It will be clear that by means of a suitable adjustment of the position of the three-way cocks, the second filter element can be disinfected in an analog manner.

It will be clear that also the device according to the second aspect of the present invention preferably is driven by a control means, in which the software is adjusted such that "forward-flush" steps are regularly performed, and in which only after a number of these steps a "backwash" step is performed.

Let it be noted that the devices according to the present invention are very suitable for building in an integrity test of the membranes on the basis of the known "bubble-point" method. To that end the device is additionally provided with a compressed air connection.

What is claimed is:

1. A device for filtering drinking water, which device is connectable to a water main system via a main cock, which device comprises:
    a) separate first and second pipes connected to the main cock;
    b) the first pipe being connected to an inflow opening of a first filter element via a first three-way cock and a third pipe;
    c) the first filter element having an outflow opening connectable to an output system via a fourth pipe, a second three-way cock and a fifth pipe;
    d) the second pipe being connected to an inflow opening of a second filter element via a third three-way cock and a sixth pipe;
    e) an outflow opening of the second filter element being connectable to the output system via a seventh pipe, a fourth three-way cock and an eighth pipe;
    f) the first three-way cock and the third three-way cock being mutually connected by a ninth pipe;
    g) the ninth pipe having a first branch through which the water can be discharged to a drain, separate from said output system, via a first closing device and a first non-return valve; and,
    h) the second three-way cock and the fourth three-way cock being mutually connected by a tenth pipe permitting direct and complete flow of water between the second and the fourth three-way cocks.

2. A device according to claim 1, wherein the tenth pipe has a first branch point, and wherein an eleventh pipe is arranged between the first branch point and a second branch point in the ninth pipe and wherein a second closing device, a pump and a heating element are arranged along the eleventh pipe.

3. A device according to claim 2, wherein a temperature meter and a pressure meter are in connection with the eleventh pipe between the heating element and the second branch point, for measuring the temperature and the pressure, respectively, of water flowing through the eleventh pipe.

4. A device according to claim 3, wherein the device contains a control means, the control means being connected to the temperature meter and the pressure meter for receiving measuring data therefrom, and the control means is connected to an operating means of the first, second, third and fourth three-way cocks, the first and second closing devices, the pump and the heating element for operation thereof.

5. A method for disinfecting a device for filtering drinking water according to claim 1, the filter device being provided with at least the first and second filter elements, wherein the filter elements are deactivated and subsequently are flushed with drinking water that has passed through one of the filter elements and has been filtered thereby, according to a closed circuit, wherein prior to being passed through a filter element for flushing purposes the filtered drinking water is brought to a disinfecting temperature of at least 65° C.

6. A method according to claim 5, wherein agents for preventing lime scale are added to the filtered drinking water.

7. A device for filtering drinking water, which device is connectable to a main system via a main cock, which device comprises:
    a) separate first and second pipes respectively connected to the main cock;
    b) the first pipe being connected to an inflow opening of a first filter element via a first three-way cock and a third pipe;
    c) the first filter element being having an outflow opening connectable to an output system via a fourth pipe, a second three-way cock and a fifth pipe;
    d) the second pipe being connected to an inflow opening of a second filter element via a third three-way cock and a sixth pipe,
    e) the second filter element having an outflow opening connectable to the output system via a seventh pipe, a fourth three-way cock and an eighth pipe;
    f) the first three-way cock and the third three-way cock being mutually connected by a ninth pipe;
    g) the second three-way cock and the fourth three-way cock being mutually connected by a tenth pipe permitting direct and complete flow of water between the second and the fourth three-way cocks;
    h) each of the first and second filter elements being provided with first and second connections, respectively, for discharging concentrate from the respective filter element to a drain;
    i) first and second further pipes, respectively, being connected to the respective first and second filter element connections and including pipe closing devices; and, j) the first and second further pipes being connected to a still further pipe for discharge of concentrate into the drain.

8. A device according to claim 7, wherein the tenth pipe has a first branch point, wherein an eleventh pipe is arranged between the first branch point and a second branch point in the ninth pipe, a second closing device, a pump and a heating element being arranged along the eleventh pipe.

9. A device according to claim 8, wherein a temperature meter and a pressure meter are in connection with the eleventh pipe between the heating element and the second branch point for measuring the temperature and the pressure, respectively, of the water flowing through the eleventh pipe.

10. A device according to claim 9, wherein the device contains a control means, the control means being connected to the temperature meter and the pressure meter for receiving measuring data therefrom, and the control means is connected to respective operating means of the first, second, third and fourth three-way cocks, the first and second closing devices, the pump and the heating element for operation thereof.

11. A method for disinfecting a device for filtering drinking water according to claim 7, the filter device being provided with at least the first and second filter elements, wherein the filter elements are deactivated and subsequently are flushed with drinking water that has passed through one of the filter elements and has been filtered thereby, according to a closed circuit, wherein prior to being passed through a filter element for flushing purposes the filtered drinking water is brought to a disinfecting temperature of at least 65° C.

12. A water filtration system comprising:
a) a spaced pair of filters:
b) water supply conduits connected to inlets of the filters and connectable to a common water supply source for delivery of water from said water supply source to the filters;
c) outlet conduits connected to outlets from the filters for delivering filtered water to a common outlet for delivering filtered water to an end use location;
d) four three-way valves each in a different one of the supply and outlet conduits;
e) the valves having a first set of backwash positions wherein the inlet of one of the filters is connected to a drain, and the inlet of the other filter is connected to said water supply source;
f) the valves having a second set of backwash positions wherein the inlet of said one filter is connected to said supply source and the inlet of said other filter is connected to said drain;
g) the outlets of both filters being connected together by a conduit when the valves are in each of the first and second sets of backwash positions whereby the one filter may be backwashed by filtered water from the other filter when the valves are in the first set of positions and said other filter may be backwashed by filtered water from said one filter when the valves are in the second set of positions; and
h) a further conduit coupled to the conduit connecting the outlets of the filters together, there being a heating element and a pump arranged along the further conduit.

13. The system of claim 12, wherein the valves have third and fourth sets of conditions respectively enabling treatment of the one filter with a treatment solution while the other filter is enabled to supply filtered water to the common outlet and enabling the treatment of the other filter as the one filter is enabled to supply filtered water to the common outlet.

* * * * *